Sept. 21, 1943. E. F. WIDIN 2,329,964
AUTOMOBILE TIRE
Filed March 13, 1942
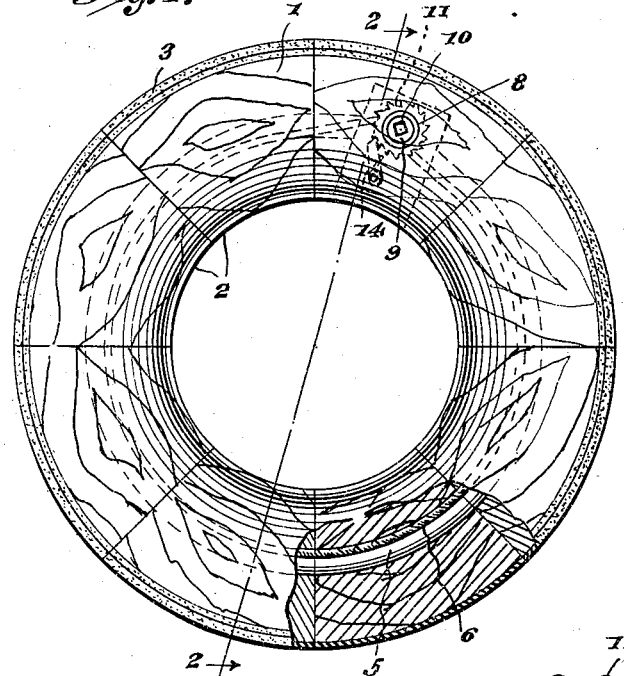
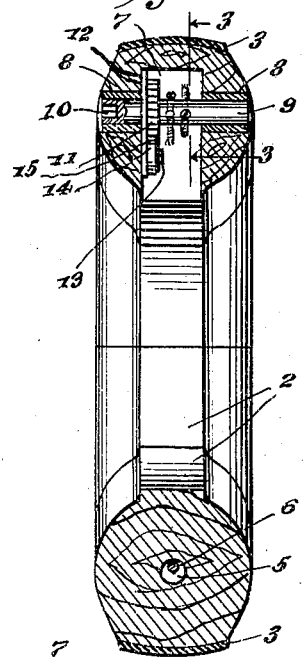
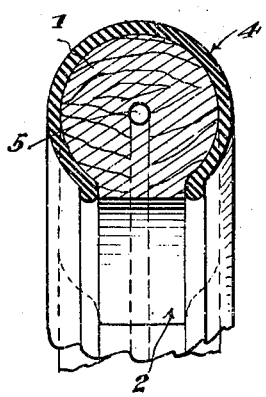
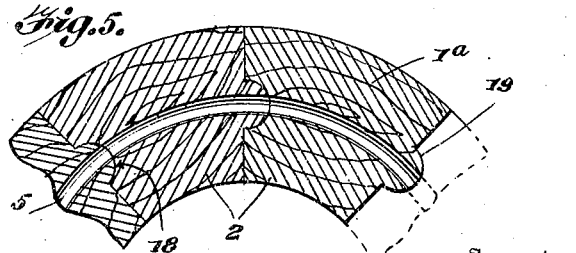
Inventor,
Edgar F. Widin.
By E. E. Vrooman & Co.,
His Attorneys.

Patented Sept. 21, 1943

2,329,964

UNITED STATES PATENT OFFICE 2,329,964

AUTOMOBILE TIRE

Edgar F. Widin, Garwood, N. J.

Application March 13, 1942, Serial No. 434,581

5 Claims. (Cl. 152—307)

This invention relates to a tire that can be applied to any type of motor vehicle wheel.

An object of the invention is the provision of a useful and practical substitution for the present rubber motor vehicle tire.

Another object of the invention is the construction of a novel and efficient tire from materials which are not required for the defense program.

A still further object of the invention is the construction of a tire device employing wood segments or blocks that will efficiently fit upon the rim of a motor vehicle wheel, and said segments or blocks held in position on the rim by means of a novel fastening device.

Another object of the invention is to provide an efficient substitute for the pneumatic tire that is generally in use at the present time, and which device or substitute will operate satisfactorily because of the fact that the modern automobile springs are sufficiently flexible to use my invention.

With the foregoing and other objects in view my invention comprises certain novel constructions, combinations, and arrangements of parts as will be hereinafter fully described, illustrated in the accompanying drawing, and more particularly pointed out in the appended claims.

In the drawing:

Figure 1 is a view partly in section and partly in side elevation of a tire constructed in accordance with the present invention.

Figure 2 is a transverse sectional view taken on line 2—2, Figure 1, looking in the direction of the arrows.

Figure 3 is an enlarged sectional view taken on line 3—3, Figure 2 and looking in the direction of the arrows.

Figure 4 is a fragmentary transverse sectional view of a modified form of the tire.

Figure 5 is a fragmentary longitudinal sectional view of another embodiment.

Referring to the drawing in which the preferred embodiment is shown in Figures 1 to 3, 1 designates the wood segments or blocks employed in the construction of this invention. Any number of these curved segments or blocks may be used, as preferred by the constructor. These segments or blocks are made to conform to the shape of the present rubber tire and of approximately the same dimensions. The wood segments are preferably impregnated with creosote to preserve them and prevent moisture absorption. The rim-engaging face 2 of the blocks or segments is made of such shape that the inner portion of the segments will fit either a standard steel rim or wheel of whatever proportions or dimensions are necessary to meet the case.

The road surface of the segments 1 are faced with a surface of leather or canvas 3, as shown in Figures 1 and 2, or if desired an old casing or covering 4, Fig. 4 may be employed.

Each wood segment or block is provided with a longitudinally-extending central aperture 5; when the segments or blocks are in an assembled position as shown in Figure 1, said apertures 5 register, and in these registered apertures is a cable 6, which may be made of any suitable material.

One of the wood segments or blocks is provided with a relatively deep compartment 7. At opposite sides of the compartment 7 and in the block are positioned two sleeve bushings 8; these bushings are in a registering position. Rotatably mounted in bushings 8 is a comparatively large rotatable shaft 9. One end of the shaft 9 is provided with a square socket 10 which is adapted to receive a tool or wrench for imparting rotary movement to the shaft. A ratchet 11 is fixedly secured to shaft 9. A metal plate 12 fits snugly in compartment 7 and is held fixedly against one of its side walls and through this plate rotatable shaft 9 extends. The plate 12 has a bolt or screw 13 supported thereon, and on bolt or screw 13 is pivotally mounted pawl 14. A spring 15 is mounted on bolt 13 and normally presses against pawl 14 for holding it at all times in engagement with the ratchet 11. Of course, the operator can manually press against pawl 14 through an opening in a rim (not shown) to disengage it from ratchet 11, when the tire is mounted on an ordinary rim.

The shaft 9 is provided with two apertures through which the ends of cable 6 are threaded (Fig. 3). Set screws 16 are in shaft 9 with their inner ends securely engaging the cable-ends for fixedly securing the cable to the shaft. The inner ends of the aperture 5, opening upon compartment 7 are inclined upwardly as clearly shown in Figure 3, with the right hand end higher than the left hand end, so that the ends of the cable 6 will properly register with the surface of shaft 9 as shown in Figure 3. Therefore, when rotary movement is imparted to shaft 9 in the direction of the arrow 17, Fig. 3, the cable 6 will be wound at two places upon the shaft for causing the cable to be drawn very taut, whereby the segments or blocks will be held tightly or snugly in an assembled position.

In the embodiment shown in Figure 5 each wood segment or block 1a is provided at one end with a socket 18 and at its other end with a rounded tenon 19, whereby the blocks interlock when in their assembled position. This construction further assists in producing a very efficient device.

The use of the term "covering" is employed in the broad sense, meaning a covering such as shown at 3 in Figure 2 or a covering such as shown at 4 in Figure 4. Any tire casing that could not be used with a pneumatic inner tube can be used in connection with my invention.

While I have described the preferred embodiments in my invention and have illustrated the same in the accompanying drawing, certain minor changes or alterations may appear to one skilled in the art to which this invention relates, during the extensive manufacture of the same, and I, therefore, reserve the right to make such alterations or changes as shall fairly fall within the scope of the appended claims.

What I claim is:

1. In a non-resilient tire, the combination of a plurality of abutting wood segments, each segment being provided with an inner rim-engaging face and with a single longitudinally-extending central aperture only, all of the single apertures registering, one of said wood segments only being provided with a single compartment, single winding means extending across said single compartment, and single cable means fastened at its ends to said single winding means and positioned in said single central apertures.

2. In a non-resilient tire, the combination of a plurality of abutting wood segments, each segment being provided with an inner rim-engaging face and with a single longitudinally-extending central aperture only, all of said single apertures registering, one of said wood segments only being provided with a single compartment, a single horizontal shaft extending across said single compartment and journalled at its ends upon opposite sides of said segment, and a single cable fastened at its ends to said single shaft and extending through all of said single central apertures.

3. In a non-resilient tire, the combination of a plurality of abutting wood segments, each segment being provided with an inner rim-engaging face and with a single longitudinally-extending central aperture only, all of the single apertures registering, one of said wood segments only being provided with a single comparatively deep compartment, a single shaft extending entirely across said single compartment and journalled at its ends upon side portions of the segment, said single shaft provided with a pair of transverse apertures, a single cable in said single aligned registering apertures of the segments, ends of said single cable threaded through the apertures of said shaft, and set screws on said shaft and normally tightly engaging the ends of the single cable within said shaft.

4. In a non-resilient tire, the combination of a plurality of abutting wood segments, each segment being provided with an inner rim-engaging face and with a single longitudinally-extending central aperture only, all of the single apertures registering, one of said wood segments only being provided with a single comparatively deep compartment, sleeve bushings in said segment at opposite sides of said compartment, a single comparatively large shaft extending entirely across said compartment and having its ends journalled in said bushings, a metal plate against one side of said compartment and having said shaft extending therethrough, said plate being mounted in fixed relation to the wall of said compartment, a ratchet fixedly secured to said shaft against said metal plate, a spring-pressed pawl pivotally mounted upon said fixed plate and normally engaging said ratchet, said shaft being provided with two cable-receiving transverse apertures, the ends of the apertures of the segments opening upon said compartment being in an inclined position and one above the other, a binding cable in all of said registering apertures of the segments, said cable having its ends threaded through the apertures of said shaft, and set screws in said shaft with their inner ends tightly clamping upon the ends of the cable within said shaft, substantially as shown and described.

5. In a non-resilient tire, the combination of a plurality of abutting segments, each segment being provided with a single longitudinally extending central aperture, all of said apertures registering, one of said segments only being provided with a compartment open at its bottom or inner end, a shaft extending transversely across said compartment and segment, a plate surrounding said shaft and in said compartment against one of its side walls, said plate being mounted in fixed relation to the wall of said compartment, a cable extending through all of said registering apertures and having its ends fastened to said shaft, whereby said single cable can be wound upon said shaft, and means on said plate and said shaft for normally holding the shaft against unwinding.

EDGAR F. WIDIN.